(12) United States Patent
Xu

(10) Patent No.: US 11,484,154 B2
(45) Date of Patent: Nov. 1, 2022

(54) MULTIFUNCTIONAL FOOD PROCESSOR

(71) Applicant: Haoming Xu, Zhejiang (CN)

(72) Inventor: Haoming Xu, Zhejiang (CN)

( * ) Notice: Subject to any disclaimer, the term of this patent is extended or adjusted under 35 U.S.C. 154(b) by 476 days.

(21) Appl. No.: 16/674,519

(22) Filed: Nov. 5, 2019

(65) Prior Publication Data

US 2021/0127903 A1 May 6, 2021

(51) Int. Cl.
*B22C 5/00* (2006.01)
*A47J 43/07* (2006.01)
*A47J 43/044* (2006.01)
*A47J 19/00* (2006.01)

(52) U.S. Cl.
CPC ......... *A47J 43/0711* (2013.01); *A47J 19/005* (2013.01); *A47J 43/044* (2013.01); *A47J 2043/04418* (2013.01); *A47J 2043/04436* (2013.01)

(58) Field of Classification Search
CPC .................................................... A47J 19/005
See application file for complete search history.

(56) References Cited

FOREIGN PATENT DOCUMENTS

KR  20090001811 U * 2/2009
WO  WO-2018191960 A1 * 10/2018 ............. A47J 19/04

OTHER PUBLICATIONS

Google machine translation for "KR-20090001811-U" (Year: 2009).*
Google machine translation for "WO-2018191960-A1" (Year: 2018).*

* cited by examiner

*Primary Examiner* — Anshu Bhatia
*Assistant Examiner* — Gregory Y Huan

(57) ABSTRACT

A multifunctional food processor includes: a container, in which a chamber is formed; and a power device, including a shell, where a sliding component mounting cavity is formed in the shell, a sliding component is mounted in the sliding component mounting cavity in a sliding manner, an elastic device is arranged between the sliding component and the shell, a pressing structure and the sliding component are connected to drive the sliding component to slide up and down, a spiral rod mounting cavity is formed in the sliding component, a mounting hole is formed in one end of the sliding component and is interconnected with the spiral rod mounting cavity, the mounting hole and a spiral rod are mated, and any of a dewatering device, a cutting device and a stirring device can be in transmission connection with the spiral rod.

8 Claims, 5 Drawing Sheets

MULTIFUNCTIONAL FOOD PROCESSOR

FIELD OF USE

The present invention relates to the field of household appliances, and in particular to a multifunctional food processor.

BACKGROUND OF THE INVENTION

The existing food processor has a single function, and one food processor only can complete one processing step of food such that the whole processing procedure of the food can be completed by multiple different food processors. The multiple food processors occupy a large space, and the existing food processor must be driven by electric power and cannot work without the electric power, so its usage is limited. Therefore, a problem to be solved urgently is to provide a multifunctional food processor which has various functions and is not driven by the electric power.

SUMMARY OF THE INVENTION

To solve the technical problem, the present invention provides a multifunctional food processor which has various functions and is not driven by electric power.

To achieve the above purpose, the present invention provides the following technical solutions.

The present invention provides a multifunctional food processor, including: a dewatering device for dewatering food; a cutting device for cutting the food; a stirring device for stirring the food; a container, internally formed with a chamber for accumulating the food, where any of the dewatering device, the cutting device and the stirring device can be arranged in the chamber; and a power device, including a shell, a pressing structure, a sliding component and a spiral rod, where the shell is supported at a top end of the container, a sliding component mounting cavity is formed in the shell, the sliding component is mounted in the sliding component mounting cavity in a sliding manner, an elastic device is arranged between the sliding component and the shell, the pressing structure is arranged at the exterior of the shell, the pressing structure and the sliding component are connected to drive the sliding component to slide up and down, a spiral rod mounting cavity is formed in the sliding component, one end of the spiral rod is mounted in the spiral rod mounting cavity in a sliding manner, a mounting hole is formed in on end of the sliding component and is interconnected with the spiral rod mounting cavity, the mounting hole and the spiral rod are mated such that the mounting hole can drive the spiral rod to rotate while the sliding component slides up and down, and any of the dewatering device, the cutting device and the stirring device can be in transmission connection with the spiral rod such that any of the dewatering device, the cutting device and the stirring device can synchronously rotate with the spiral rod.

Further, the multifunctional food processor further includes a guide frame arranged in the sliding component mounting cavity, where the guide frame includes a plurality of support bars, an upper collar and a lower base plate, the upper collar and the lower base plate are arranged in parallel and correspondingly, each support bar is arranged between the upper collar and the lower base plate, one end of the support bar is connected with the upper collar while the other end thereof is connected with the lower base plate, the upper collar is arranged on an outer side wall of the sliding component, and a through hole is formed in the lower base plate and is used for allowing penetration of the spiral rod.

Further, the elastic device is a spring, the spring sleeves an outer side wall of the spiral rod, and one end of the spring is propped against one end of the sliding component while the other end thereof is propped against the lower base plate.

Further, the multifunctional food processor further includes a multifunctional connecting column, where a limiting groove and a positioning ring are arranged at one end of the multifunctional connecting column, the positioning ring is rotatably supported at a bottom end of the shell, a positioning pin is arranged at one end of the spiral rod, a plurality of inclined bumps are uniformly and circumferentially arranged on the bottom surface of the limiting groove, a locking slot is formed between any two adjacent inclined bumps, and two ends of the positioning pin correspond to two locking slots one to one; when the spiral rod forwardly rotates, the positioning pin is locked in the locking slots, and the multifunctional connecting column and the spiral rod synchronously rotate; when the spiral rod reversely rotates, the locating pin is separated from the locking slots, the spiral rod idles, and the other end of the multifunctional connecting column sequentially penetrates the bottom end of the shell and the top end of the container, extends into the chamber and can be detachably connected with any of the dewatering device, the cutting device and the stirring device.

Further, the positioning ring is rotatably supported at the bottom end of the shell through a bearing.

Further, the multifunctional food processor further includes a switch button, where the switch button includes a mounting plate, a protruded block and a locking block, the protruded block and the locking block are arranged on the mounting plate, the mounting plate is mounted on an inner wall of the shell in a sliding manner, a limiting hole is formed in the shell and is interconnected with the sliding component mounting cavity, the protruded block is mounted in the limiting hole in a sliding manner, and a groove is formed in the sliding component and matches with the locking block.

Further, the multifunctional food processor further includes a switch positioning component, where the switch positioning component is detachably mounted on an inner wall of the shell, a mounting space is formed between the switch positioning component and the inner wall of the shell, and the mounting plate is mounted in the mounting space in a sliding manner.

Further, the shell includes a first shell and a lower cover, the sliding component mounting cavity is formed in the first shell and penetrates two ends of the first shell, the lower cover encloses a bottom end of the first shell and is detachably connected with the bottom end of the first shell, and the lower cover is supported at the top end of the container.

Further, the container includes a second shell and a third upper cover, a chamber is formed in the second shell and penetrates a top end of the second shell, the third upper cover encloses the top end of the second shell and is detachably connected with the top end of the second shell, and the shell is supported on the third upper cover.

Further, an anti-slip wafer is arranged at the bottom end of the container.

Compared with the prior art, the present invention achieves the following technical effects:

the multifunctional food processor provided by the present invention includes a dewatering device for dewatering food; a cutting device for cutting the food; a stirring device for stirring the food; a container, internally formed with a chamber for accumulating the food, where any of the dewatering device, the cutting device and the stirring device can be arranged in the chamber; and a power device, including a shell, a pressing structure, a sliding component and a spiral rod, where the shell is supported at a top end of the container, a sliding component mounting cavity is formed in the shell, the sliding component is mounted in the sliding component mounting cavity in a sliding manner, an elastic device is arranged between the sliding component and the shell, the pressing structure is arranged at the exterior of the shell, the pressing structure and the sliding component are connected to drive the sliding component to slide up and down, a spiral rod mounting cavity is formed in the sliding component, one end of the spiral rod is mounted in the spiral rod mounting cavity in a sliding manner, a mounting hole is formed in one end of the sliding component and is interconnected with the spiral rod mounting cavity, the mounting hole and the spiral rod are mated such that the mounting hole can drive the spiral rod to rotate while the sliding component slides up and down, and any of the dewatering device, the cutting device and the stirring device can be in transmission connection with the spiral rod such that any of the dewatering device, the cutting device and the stirring device can synchronously rotate with the spiral rod. The multifunctional food processor integrates functions of dewatering, cutting, stirring and the like; in a specific using procedure, the pressing structure is pressed by human hands, the mounting hole drives the spiral rod to rotate while the sliding component moves downwards, and the spiral rod drives one of the dewatering device, the cutting device and the stirring device to work; and when the human hands loosen the pressing structure, the pressing structure automatically rebounds under the action of the elastic device such that the working of the device does not depend on electric power, and the device has a wider application range.

BRIEF DESCRIPTION OF THE DRAWINGS

To describe the technical solutions in the embodiments of the present invention or in the prior art more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

Figure 1:
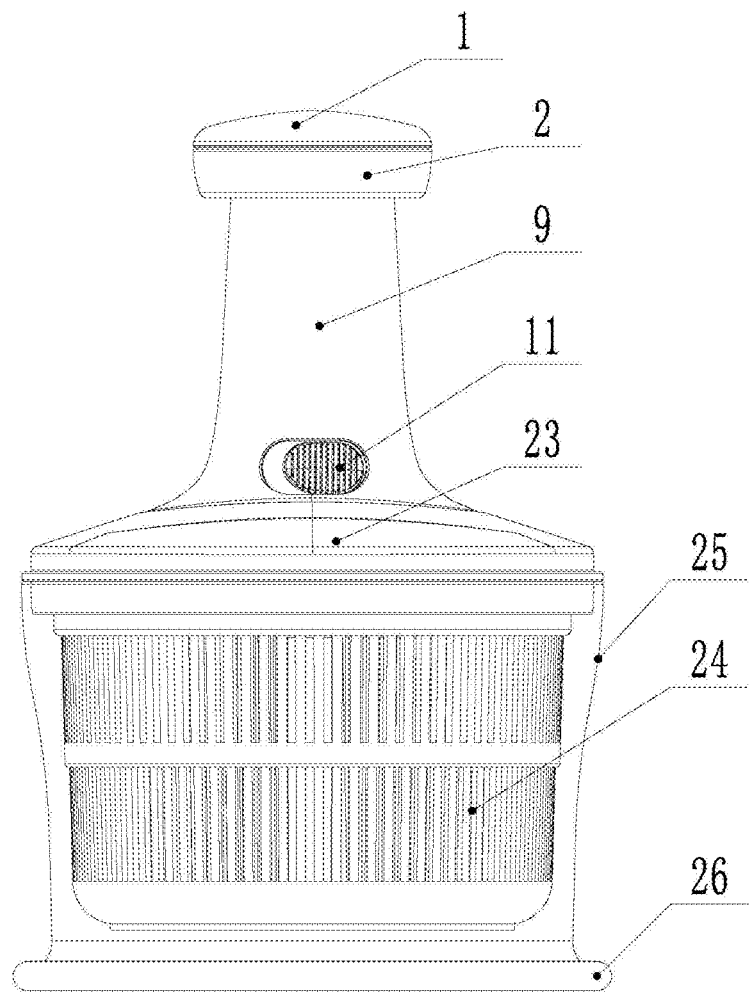
FIG. 1 is a schematic structural diagram of a multifunctional food processor provided in embodiments of the present invention in a food dewatering procedure.
Figure 2:
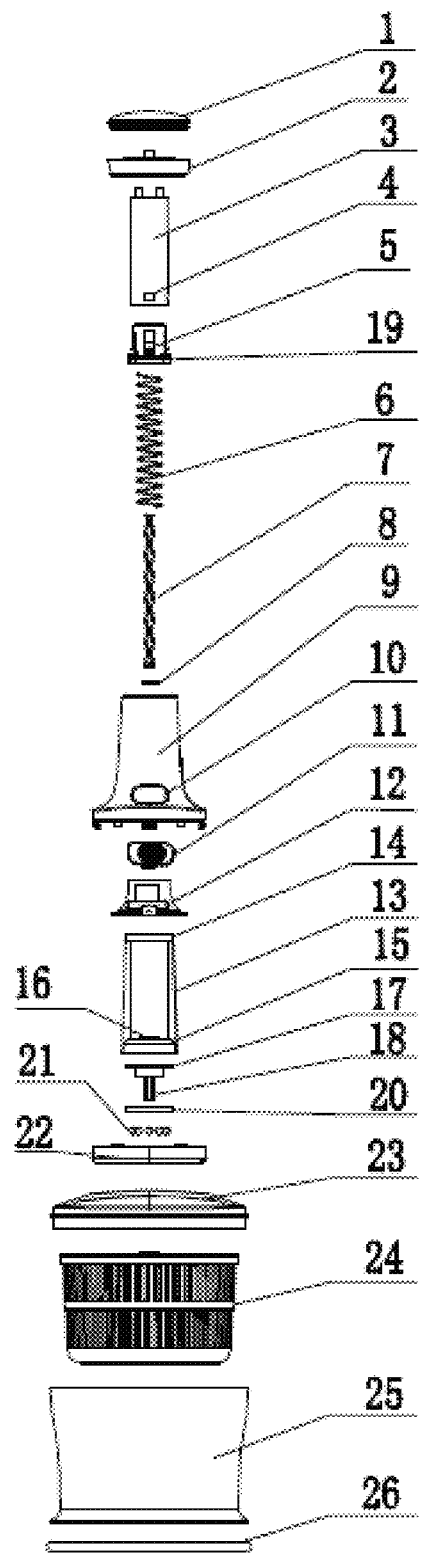
FIG. 2 is an exploded view of FIG. 1.
Figure 3:
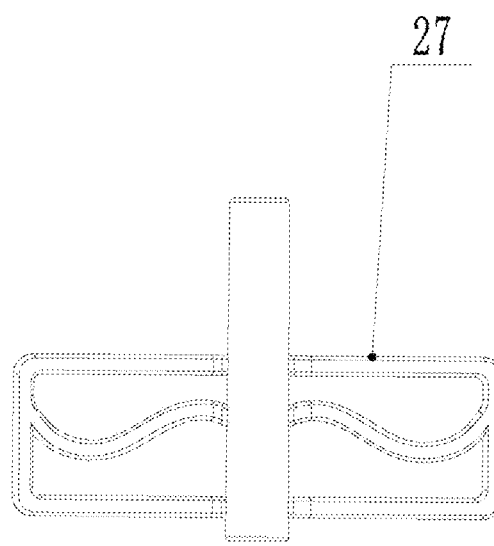
FIG. 3 is a schematic structural diagram of a stirring device provided in embodiments of the present invention.
Figure 4:
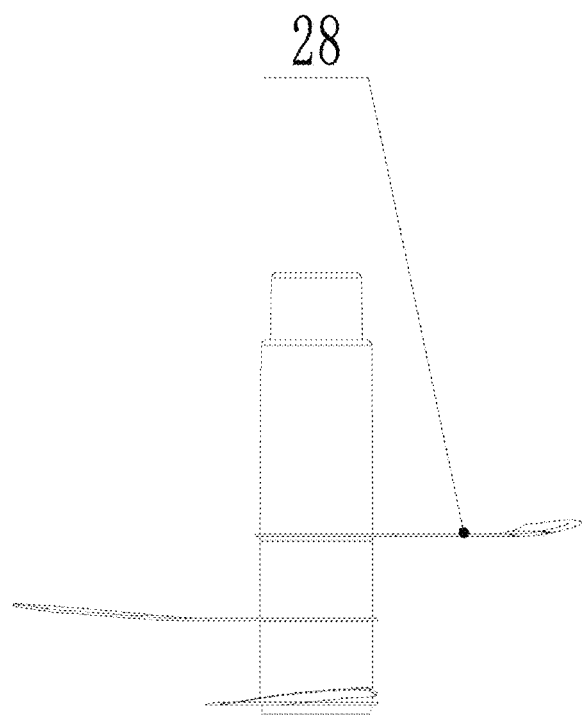
FIG. 4 is a schematic structural diagram of a cutting device provided in embodiments of the present invention.

In the drawings: 1—first upper cover; 2—second upper cover; 3—third shell; 4—groove; 5—positioning buckle; 6—spring; 7—spiral rod; 8—positioning pin; 9—first shell; 10—limiting hole; 11—switch button; 12—switch positioning component; 13—support bar; 14—upper collar; 15—lower base plate; 16—through hole; 17—limiting ring; 18—multifunctional connecting column; 19—positioning ring; 20—bearing sleeve; 21—glass bead; 22—lower cover; 23—third upper cover; 24—dewatering device; 25—second shell; 26—anti-slip wafer; 27—stirring device; 28—cutting device; 29—limiting groove; 30—first side face; 31—second side face and 32—locking slot.

DETAILED DESCRIPTION OF THE ILLUSTRATED EMBODIMENTS

The following clearly and completely describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

An objective of the present invention is to provide a multifunctional food processor which has various functions and is not driven by electric power.

To make the foregoing objective, features, and advantages of the present invention clearer and more comprehensible, the present invention is further described in detail below with reference to the accompanying drawings and specific embodiments.

As shown in FIG. 1 to FIG. 4, the embodiment provides a multifunctional food processor, including a dewatering device 24 for dewatering food; a cutting device 28 for cutting the food; a stirring device 27 for stirring the food; a container, internally formed with a chamber for accumulating the food, where any of the dewatering device 24, the cutting device 28 and the stirring device 27 can be arranged in the chamber; and a power device, including a shell, a pressing structure, a sliding component and a spiral rod 7, where the shell is supported at a top end of the container, a sliding component mounting cavity is formed in the shell, the sliding component is mounted in the sliding component mounting cavity in a sliding manner, an elastic device is arranged between the sliding component and the shell, the pressing structure is arranged at the exterior of the shell, the pressing structure and the sliding component are connected to drive the sliding component to slide up and down, a spiral rod mounting cavity is formed in the sliding component, one end of the spiral rod 7 is mounted in the spiral rod mounting cavity in a sliding manner, a mounting hole is formed in one end of the sliding component and is interconnected with the spiral rod mounting cavity, the mounting hole and the spiral rod 7 are mated such that the mounting hole can drive the spiral rod 7 to rotate while the sliding component slides up and down, and any of the dewatering device 24, the cutting device 28 and the stirring device 27 can be in transmission connection with the spiral rod 7 such that any of the dewatering device 24, the cutting device 28 and the stirring device 27 can synchronously rotate with the spiral rod 7. Specifically, the dewatering device 24 is a dewatering basket; the cutting device 28 is a blade; the stirring device 27 is a stirring blade; the pressing structure includes a first upper cover 1 and a second upper cover 2, which are arranged up and down, and the first upper cover 1 and the second upper cover 2 are connected through snap-fit assemblies or screws; and the dewatering device 24, the cutting device 28 and the stirring device 27 are respectively in transmission connection with the spiral rod 7 through a central shaft. The multifunctional food processor integrates functions of dewatering, cutting, stirring and the like; in a specific using procedure, the pressing structure is pressed by human hands, the mounting hole drives the spiral rod 7 to rotate while the sliding component moves downwards, and the spiral rod 7 drives one of the dewatering device 24, the cutting device 28 and the stirring device 27 to work; and when the human hands loosen the pressing structure, the pressing structure automatically rebounds under the action of the elastic device such that the working of the device does not depend on electric power, and the device has a wider application range.

Furthermore, the dewatering device 24, the cutting device 28 and the stirring device 27 are made from antibacterial materials, so the device has good antibacterial property and high safety.

Furthermore, it should be noted that the working principle of the spiral rod 7 is to transform a linear motion to rotation, and in the embodiment, the sliding component slides up and down, the mounting hole drives the spiral rod 7 to rotate, and meanwhile, the spiral rod 7 and the sliding component conduct relative motion, for example, the sliding component moves downwards, the spiral rod 7 rotates and simultaneously moves upwards corresponding to the sliding component.

In another embodiment of the present invention, the multifunctional food processor further includes a guide frame arranged in the sliding component mounting cavity, the guide frame includes a plurality of support bars 13, an upper collar 14 and a lower base plate 15, the upper collar 14 and the lower base plate 15 are arranged in parallel and correspondingly, each support bar 13 is arranged between the upper collar 14 and the lower base plate 15, one end of the support bar 13 is connected with the upper collar 14 while the other end thereof is connected with the lower base plate 15, the upper collar 14 is arranged on an outer side wall of the sliding component, and a through hole 16 is formed in the lower base plate 15 and is used for allowing penetration of the spiral rod 7. Due to arrangement of the guide frame, the sliding component and the spiral rod 7 slide smoothly and are hard to incline in a sliding procedure.

Furthermore, to prevent the upper collar 14 and the sliding component from separating from each other, a limiting ring 17 is arranged at one end of the sliding component, an outer diameter of the limiting rind 17 is greater than an inner diameter of the upper collar 14, a plurality of first guide slots are formed in a side wall of the limiting ring 17, a support bar 13 is mounted in a first guide slot in a sliding manner, and specifically, there are two support bars 13 and two first guide slots.

Furthermore, second guide slots are formed in each support bar 13 in a length direction of the support bar 13, a plurality of guide blocks are arranged on an inner wall of the shell, one guide block is mounted in one second guide slot in a sliding manner, and specifically, there are two guide blocks. The sliding component can more smoothly slide due to arrangement of the second guide slots and the second guide blocks.

In another embodiment of the present invention, the elastic device is a spring 6, the spring 6 sleeves an outer side wall of the spiral rod 7, and one end of the spring 6 is propped against one end of the sliding component while the other end thereof is propped against the lower base plate 15.

Figure 5:
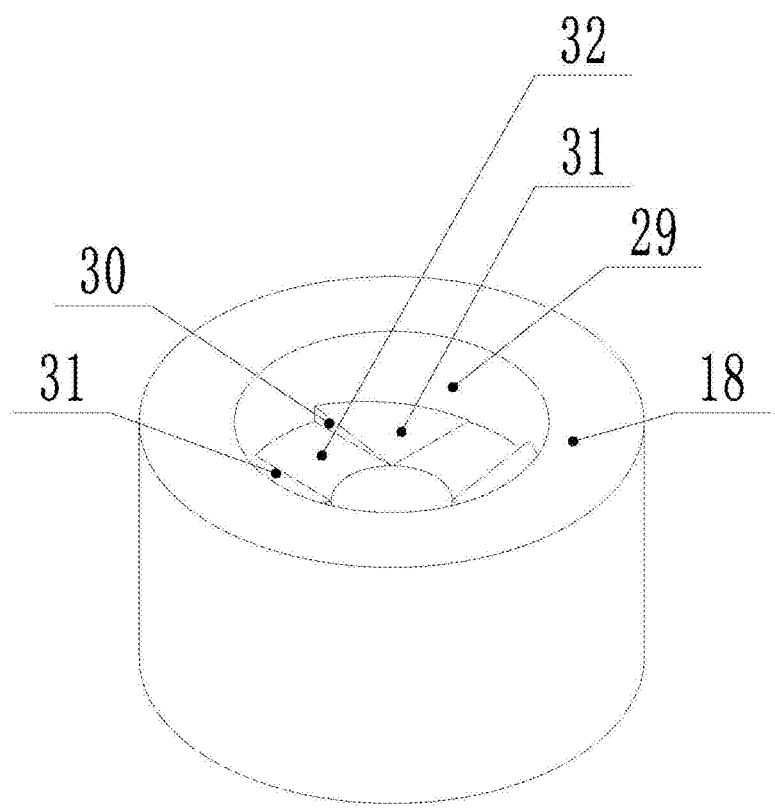
FIG. 5 is a schematic diagram showing an arrangement manner of inclined bumps provided in embodiments of the present invention.

In another embodiment of the present invention, as shown in FIG. 5, the multifunctional food processor further includes a multifunctional connecting column 18, a limiting groove 29 and a positioning ring 19 are arranged at one end of the multifunctional connecting column 18, the positioning ring 19 is rotatably supported at a bottom end of the shell, a positioning pin 8 is arranged at one end of the spiral rod 7, a plurality of inclined bumps are uniformly and circumferentially arranged on the bottom surface of the limiting groove 29, a locking slot 32 is formed between any two adjacent inclined bumps, and two ends of the positioning pin 8 correspond to two locking slots 32 one to one; when the spiral rod 7 forwardly rotates, the positioning pin 8 is locked in the locking slots 32, and the multifunctional connecting column 18 and the spiral rod 7 synchronously rotate; when the spiral rod 7 reversely rotates, the locating pin 8 is separated from the locking slots 32, the spiral rod 7 idles (the multifunctional connecting column 18 and the spiral rod 7 respectively independently rotate), and the other end of the multifunctional connecting column 18 sequentially penetrates the bottom end of the shell and the top end of the container, extends into the chamber and can be detachably connected with any of the dewatering device 24, the cutting device 28 and the stirring device 27. Due to such arrangement, the device is convenient to detach. Specifically, the multifunctional connecting column 18 has a prism structure, any of the dewatering device 24, the cutting device 28 and the stirring device 27 is provided with a mounting groove matching with the prism structure and is arranged in the mounting groove through the prism structure, and the dewatering device 24, the cutting device 28 and the stirring device 27 can synchronously rotate with the prism structure; and there are four inclined bumps, the inclined bump includes a first side face 30 and a second side face 31, the first side face 30 is vertically arranged while the second side face 31 is inclined, and a locking slot 32 is formed between the first side face 30 of one of any two adjacent inclined bumps and the second side face 31 of the other one.

In a specific working procedure, when the spiral rod 7 reversely rotates, two ends of the positioning pin 8 can slide out of the locking slots 32 along the inclined second side faces 31; and when the spiral rod 7 forwardly rotates, the two ends of the positioning pin 8 are propped against the vertical first side faces 30, and the first side faces 30 limit the rotation of the positioning pin 8 such that the positioning pin 8 drives the multifunctional connecting column 18 to synchronously rotate.

Furthermore, the positioning ring 19 is rotatably supported at the bottom end of the shell through a bearing to reduce a friction force between the positioning ring 19 and the bottom end of the shell. Specifically, the bearing includes a bearing sleeve 20 and glass beads 21 uniformly and rotatably arranged on the bearing sleeve 20 in a circumferential direction of the bearing sleeve 20.

In another embodiment of the present invention, the multifunctional food processor further includes a switch button 11, the switch button 11 includes a mounting plate, a protruded block and a locking block, the protruded block and the locking block are arranged on the mounting plate, the mounting plate is mounted on an inner wall of the shell in a sliding manner, a limiting hole 10 is formed in the shell and is interconnected with the sliding component mounting cavity, the protruded block is mounted in the limiting hole 10 in a sliding manner, and a groove 4 is formed in the sliding component and matches with the locking block.

Specifically, the sliding component includes a third shell 3 and a positioning buckle 5, a spiral rod mounting cavity is formed in the third shell 3, the groove 4 is formed in a side wall of the third shell 3, a mounting hole is formed in the positioning buckle 5, the positioning buckle 5 is provided with an inclined buckling block, the inclined buckling block is also clamped in the groove 4 to achieve fixation of the positioning buckle 5, and the limiting ring 17 is arranged on the positioning buckle 5.

In a specific using procedure, when the locking block and the groove 4 are separated, the sliding component can slide up and down; when the locking block is mounted in the groove 4, the sliding component is locked has a fixed position; when the locking block is mounted in the groove 4, the sliding component is completely mounted in the sliding component mounting cavity; and the device has a small size and is convenient to carry.

Furthermore, to facilitate mounting of the switch button 11, the multifunctional food processor further includes a switch positioning component 12, the switch positioning component 12 is detachably mounted on an inner wall of the shell, a mounting space is formed between the switch positioning component 12 and the inner wall of the shell, and the mounting plate is mounted in the mounting space in a sliding manner. Specifically, the switch positioning component 12 is mounted on the inner wall of the shell through bolts.

In another embodiment of the present invention, to facilitate detachment of the device, the shell includes a first shell 9 and a lower cover 22, the sliding component mounting cavity is formed in the first shell 9 and penetrates two ends of the first shell 9, the size of the pressing structure is greater than the size of the sliding component mounting cavity to prevent the pressing structure from extending into the sliding component mounting cavity, the lower cover 22 encloses a bottom end of the first shell 9 and is detachably connected with the bottom end of the first shell 9, the lower cover 22 is supported at the top end of the container, and the limiting hole 10 is formed in the first shell 9; and the container includes a second shell 25 and a third upper cover 23, a chamber is formed in the second shell 25 and penetrates a top end of the second shell 25, the third upper cover 23 encloses the top end of the second shell 25 and is detachably connected with the top end of the second shell 25, and the shell is supported on the third upper cover 23. Specifically, the lower cover 22 and the bottom end of the first shell 9 are connected through the snap-fit assemblies or the screws, and the third upper cover 23 and the top end of the second shell 25 are connected through the snap-fit assemblies or the screws.

Several examples are used for illustration of the principles and implementation methods of the present invention. The description of the embodiments is used to help illustrate the method and its core principles of the present invention. In addition, those skilled in the art can make various modifications in terms of specific embodiments and scope of application in accordance with the teachings of the present invention. In conclusion, the content of this specification shall not be construed as a limitation to the invention.

What is claimed is:

1. A multifunctional food processor, comprising:
    a dewatering device for dewatering food;
    a cutting device for cutting the food;
    a stirring device for stirring the food;
    a container, internally formed with a chamber for accumulating the food, wherein any of the dewatering device, the cutting device and the stirring device can be arranged in the chamber; and a power device, comprising a shell, a pressing structure, a sliding component and a spiral rod, wherein the shell is supported at a top end of the container, a sliding component mounting cavity is formed in the shell, the sliding component is mounted in the sliding component mounting cavity in a sliding manner, an elastic device is arranged between the sliding component and the shell, the pressing structure is arranged at the exterior of the shell, the pressing structure and the sliding component are connected to drive the sliding component to slide up and down, a spiral rod mounting cavity is formed in the sliding component, one end of the spiral rod is mounted in the spiral rod mounting cavity in a sliding manner, a mounting hole is formed in one end of the sliding component and is interconnected with the spiral rod mounting cavity, the mounting hole and the spiral rod are mated such that the mounting hole can drive the spiral rod to rotate while the sliding component slides up and down, and any of the dewatering device, the cutting device and the stirring device can be in transmission connection with the spiral rod such that any of the dewatering device, the cutting device and the stirring device can synchronously rotate with the spiral rod;
    the multifunctional food processor further comprises:
    a guide frame arranged in the sliding component mounting cavity, wherein the guide frame comprises a plurality of support bars, an upper collar and a lower base plate, the upper collar and the lower base plate are arranged in parallel and correspondingly, each support bar is arranged between the upper collar and the lower base plate, one end of the support bar is connected with the upper collar while the other end thereof is connected with the lower base plate, the upper collar is arranged on an outer side wall of the sliding component, and a through hole is formed in the lower base plate and is used for allowing penetration of the spiral rod.

2. The multifunctional food processor according to claim 1, wherein the elastic device is a spring, the spring sleeves an outer side wall of the spiral rod, and one end of the spring is propped against one end of the sliding component while the other end thereof is propped against the lower base plate.

3. The multifunctional food processor according to claim 1, further comprising a multifunctional connecting column, wherein a limiting groove and a positioning ring are arranged at one end of the multifunctional connecting column, the positioning ring is rotatably supported at a bottom end of the shell, a positioning pin is arranged at one end of the spiral rod, a plurality of inclined bumps are uniformly and circumferentially arranged on the bottom surface of the limiting groove, a locking slot is formed between any two adjacent inclined bumps, and two ends of the positioning pin correspond to two locking slots one to one; when the spiral rod forwardly rotates, the positioning pin is locked in the locking slots, and the multifunctional connecting column and the spiral rod synchronously rotate; when the spiral rod reversely rotates, the locating pin is separated from the locking slots, the spiral rod idles, and the other end of the multifunctional connecting column sequentially penetrates the bottom end of the shell and the top end of the container, extends into the chamber and can be detachably connected with any of the dewatering device, the cutting device and the stirring device.

4. The multifunctional food processor according to claim 3, wherein the positioning ring is rotatably supported at the bottom end of the shell through a bearing.

5. The multifunctional food processor according to claim 1, further comprising a switch positioning component, wherein the switch positioning component is detachably mounted on an inner wall of the shell, a mounting space is formed between the switch positioning component and the inner wall of the shell, and the mounting plate is mounted in the mounting space in a sliding manner.

6. The multifunctional food processor according to claim 1, wherein the shell comprises a first shell and a lower cover, the sliding component mounting cavity is formed in the first shell and penetrates two ends of the first shell, the lower cover encloses a bottom end of the first shell and is detachably connected with the bottom end of the first shell, and the lower cover is supported at the top end of the container.

7. The multifunctional food processor according to claim 1, wherein the container comprises a second shell and a third upper cover, a chamber is formed in the second shell and penetrates a top end of the second shell, the third upper cover encloses the top end of the second shell and is detachably connected with the top end of the second shell, and the shell is supported on the third upper cover.

8. The multifunctional food processor according to claim 1, wherein an anti-slip wafer is arranged at the bottom end of the container.

* * * * *